United States Patent
Bremer

Patent Number: 6,160,790
Date of Patent: Dec. 12, 2000

[54] CROSSTALK CANCELLER SYSTEM AND METHOD

[75] Inventor: Gordon Bremer, Clearwater, Fla.

[73] Assignee: Paradyne Corporation, Largo, Fla.

[21] Appl. No.: 08/808,893

[22] Filed: Feb. 28, 1997

Related U.S. Application Data

[60] Provisional application No. 60/034,455, Dec. 31, 1996.

[51] Int. Cl.[7] ...................................................... H04J 1/12
[52] U.S. Cl. ............................................ 370/201; 370/286
[58] Field of Search ...................................... 370/201, 286, 370/287, 288, 289, 290, 291; 379/410, 411, 4, 6, 417; 375/257, 219; 345/58; 455/510

[56] References Cited

U.S. PATENT DOCUMENTS

| | | | |
|---|---|---|---|
| 4,087,654 | 5/1978 | Mueller | 179/170.2 |
| 4,131,767 | 12/1978 | Weinstein | 179/2 |
| 4,464,545 | 8/1984 | Werner | 179/170.2 |
| 4,715,064 | 12/1987 | Claessen | 379/392 |
| 4,995,104 | 2/1991 | Gitlin | 370/6 |
| 5,271,037 | 12/1993 | Szechenyi | 375/14 |
| 5,483,551 | 1/1996 | Huang et al. | 375/219 |
| 5,832,032 | 12/1998 | Overbury | 375/285 |
| 5,887,032 | 3/1999 | Cioffi | 375/257 |

*Primary Examiner*—Huy D. Vu
*Assistant Examiner*—Alexander Boakye
*Attorney, Agent, or Firm*—Thomas, Kayden, Horstemeyer & Risley, LLP

[57] ABSTRACT

A crosstalk canceller system is disclosed for a transceiver bank, which has one or more transmitters and one or more receivers, for cancelling crosstalk between signals associated with different communications channels having overlapping frequency bands. In a simplified embodiment, the system includes a crosstalk canceller (CC) connected between transmit and receive connections to receive a transmit signal and receive signal, respectively, associated with different communications channels. The CC produces a cancellation signal and passes the cancellation signal to an adder. The adder combines the cancellation signal with the receive signal to generate an enhanced receive signal, which is communicated to the receiver and also back to the CC. The enhanced receive signal is characterized by less crosstalk as compared to the original receive signal. In more complicated embodiments having a transceiver bank with a plurality of transmitters and receivers, a CC can be associated with each transmitter and/or receiver in order to reduce crosstalk imposed upon a single signal (receive or transmit signal) by multiple sources. A control mechanism can be configured to determine and store in a performance table crosstalk contribution values, each of which corresponds with an amount of crosstalk imposed by a particular source to a particular signal connection. The control mechanism implements the CCs relative to each source that has a crosstalk value below a predefined threshold. The control mechanism refrains from implementing the CCs relative to each source that has a crosstalk value of at least the threshold.

57 Claims, 7 Drawing Sheets

CROSSTALK CANCELLER SYSTEM AND METHOD

For this application and pursuant to 35 U.S.C. Section 119, the inventor herein claims priority to and the benefit of the filing date of a copending commonly assigned provisional application entitled, "METHOD FOR IMPROVING COMMUNICATION PERFORMANCE: CROSSTALK CANCELLATION," filed Dec. 30, 1996, assigned Ser. No. 60/034,455, and which is incorporated herein by reference.

FIELD OF THE INVENTION

The present invention generally relates to telecommunications and telephony, and, more particularly, to a crosstalk canceller system and method for a transceiver bank for cancelling crosstalk between signals associated with different communications channels. The crosstalk canceller system and method are particularly suited for implementation in a transceiver bank, which has one or more transmitters and one or more receivers, for minimizing crosstalk between analog telephonic transmission and reception connections that carry signals having overlapping frequency bands.

BACKGROUND OF THE INVENTION

Echo cancellation in two-way communications systems is well known and well developed in the art. More specifically, in regard to the concept of echos, full duplex transmission systems provide for full bandwidth transmission in both directions over a common medium, such as a telephone line. A hybrid is utilized to separate the transmit and receive signals from a two-wire connection. During the transmission and reception processes, the receive signal can be corrupted by the transmit signal. The corruption is oftentimes referred to as an "echo" in that the corruption is substantially similar to the transmit signal, although attenuated in amplitude and delayed in phase in comparison. Many systems have been developed in the art for cancelling, or removing the echo from the receive signal. As examples among many others, consider the echo cancellers described in U.S. Pat. No. 4,464,545 to Werner and also in U.S. Pat. No. 4,087,654 to Mueller.

The concept of crosstalk is similar to the concept of an echo and is at issue in the present application because crosstalk is a significant limiting performance factor in broadband data communication technologies, such as asymmetric digital subscriber line (ADSL). "Crosstalk" is defined as interference resulting from the inadvertent coupling of a signal on a first connection associated with a first communications channel onto a second connection associated with a second communications channel that is different than the first. The coupling usually occurs as a result of the close proximity of the wires of the respective connections. Each connection may carry a communications channel that is one directional or two directional, as well as half duplex or full duplex. The context in which crosstalk is generally a significant problem is in a transceiver bank that contains one or more transmitters and one or more receivers. In this configuration, a receiver in the transceiver bank may have a receiver that receives a corrupted receive signal that has been corrupted via crosstalk by one or more transmitters associated with other different communications channels. Echo corruption is different than crosstalk corruption because echo corruption involves corruption imposed upon a receive signal by a transmitter that is associated with the same communications channel as the receive signal.

As shown by way of example in FIG. 1, a system 9 includes a transceiver bank 11 having a transmitter 12 for generating a transmit signal along a transmission connection 13 and a receiver 15 for receiving a receive signal along a reception connection 17. The transmit signal is associated with a first communications channel, and the receive signal is associated with a second communications channel. Each of the connections 13, 17 may be a single wire or two wire configuration, and the connections 13, 17 are often bundled together, making crosstalk a more prominent possibility. Crosstalk involves the unintentional and undesirable coupling of the transmit signal from the connection 13 associated with the first communications channel (e.g. channel #1) to the receive signal on connection 17 associated with the second communications channel (e.g., channel #2). This coupling is due to capacitive and/or inductive coupling between the wires themselves and/or between the transmitter 12 and the receiver 15. Crosstalk appears as noise on the reception connection 17 and is thus a limiting factor in error free performance of information signals on the reception connection 17. Furthermore, crosstalk is especially a limiting factor if the transmission connection 13 is transmitting a signal at high amplitude, while the reception connection 17 is receiving a signal at low amplitude.

Crosstalk may extend beyond more than two communications channels. Indeed, in many central site cases, dozens or hundreds of wires may be bundled together so that the net crosstalk at a particular receiver may be due to many different transmission sources. Also, worth noting is that crosstalk can also be imposed upon a transmit signal by one or more reception sources.

If the interfering signals have nonoverlapping frequency bands, then it may be possible that a filter can be associated with the receiver to filter off the crosstalk in order to permit accurate reception. However, if the frequency bands overlap to any extent, such filtering cannot adequately be accomplished.

Thus, a heretofore unaddressed need exists in the industry for a crosstalk canceller system and method for cancelling crosstalk in a transceiver bank between separate communications channels having respective connections that carry corresponding signals having overlapping frequency bands.

SUMMARY OF THE INVENTION

Briefly described, the invention is a crosstalk canceller (CC) system and method for a transceiver bank for reducing crosstalk between first and second communications channels having overlapping frequencies and respective physical connections in a communications device, such as telephonic transmission and reception connections. The CC system and method are particularly suited to cancel transmission crosstalk on a reception connection from one or more transmission and/or reception sources. However, the CC system and method can also be utilized to cancel reception crosstalk imposed upon a transmit signal by one or more transmission and/or reception sources.

In general, the architecture of one simple embodiment of the CC system is constructed as follows. A transmitter is configured to transmit a transmit signal associated with a first communications channel on a transmit connection. A receiver is configured to receive a receive signal associated with a second communications channel on a receive connection. Further, a CC is connected between the transmit and receive connections to receive a transmit signal and receive signal, respectively. The CC produces a cancellation signal and passes the cancellation signal to an adder. The adder combines the cancellation signal with the receive signal to generate an enhanced receive signal, which is communicated to the receiver and back to the CC. The enhanced receive signal is characterized by less crosstalk as compared to the original receive signal.

The invention may be implemented in the context of a plurality of transmitters and receivers in order to reduce crosstalk, if present at unsuitable levels, imposed upon a signal (receive or transmit) by the various signal sources. As an example, in the context of crosstalk imposed upon a receive signal by multiple transmit sources, the invention may be architected as follows.

Transmitters are configured to transmit respective transmit signals on corresponding transmit connections. Receivers are configured to receive respective receive signals on corresponding receive connections. A CC is associated with each transmit connection for generating a cancellation signal from a corresponding transmit signal.

Adders combine a corresponding receive signal and a corresponding cancellation signal from a corresponding CC to produce a respective enhanced receive signal. Each adder communicates the enhanced receive signal to a respective receiver and the respective CC.

Optionally, the system may be equipped with intelligence to prevent over-compensation. In this regard, a plurality of correlators may be connected between each of the transmit connections. Each correlator receives two transmit signals, correlates the signals, and generates a correlation signal indicative of whether the transmit signals correspond. A control mechanism may be configured to receive the correlation signals. Based upon the correlation signals, the control mechanism will permit operation of CCs and/or deactivate CCs. Additionally, the control mechanism may be configured to determine and store crosstalk contribution values. Each of the values corresponds with an amount of crosstalk attributable from a particular transmitter and corresponding transmit connection to a particular receive connection. The values are stored in a performance table. The control mechanism implements the CCs relative to each transmitter (and corresponding transmit connection) that has a value above a predetermined threshold. Furthermore, the control mechanism refrains from implementing the CCs relative to each transmitter (and corresponding transmit connection) that has a value below the predetermined threshold.

The performance table may also be designed to store an indication as to whether each transmitter and each receiver is activated or deactivated. With this information, the control mechanism can easily recognize and refrain from implementing the CCs that are associated with deactivated transmitters and deactivated receivers.

The invention can also be broadly conceptualized as a method for improving performance by minimizing crosstalk in a transceiver bank that has separate first and second connections that carry respective first and second signals associated with different communications channels. The method can be broadly summarized by the following steps: receiving the first signal from the first connection; receiving the second signal from the second connection; combining a cancellation signal with the second signal to generate an enhanced second signal; and producing the cancellation signal based upon the enhanced second signal and the first signal. Significantly, the foregoing methodology can be applied to reduce crosstalk imposed upon a single signal by multiple sources.

The invention has numerous advantages, a few of which are delineated hereafter, as examples.

An advantage is that crosstalk interference, or noise, is minimized in a transceiver bank so that communications can be accomplished at higher data rates.

Another advantage of the invention is that it can be employed to reduce crosstalk from one or more different transmission sources and/or from one or more reception sources.

Another advantage of the invention is that it can be employed with an intelligent control mechanism to more intelligently reduce crosstalk from one or more different transmission sources and/or from one or more reception sources by selectively activating and deactivating CCs. The activation/deactivation decisions may be based upon, e.g., whether or not a transmitter or receiver is in operation, whether or not signals to be compensated for correlate, whether or not crosstalk from a particular source has reached a predefined threshold, etc.

Another advantage of the invention is that it can be implemented in software, hardware, or a combination thereof.

Another advantage of the invention is that it can be implemented entirely within a digital signal processor (DSP), if desired.

Another advantage of the invention is that it can be employed in connection with a transceiver bank that is interconnected with the public switched telephone network (PSTN).

Another advantage is that the CC system is simple in design, reliable in operation, and easily implemented on a mass scale for commercial production.

Other objects, features, and advantages of the present invention will become apparent to one with skill in the art upon examination of the following drawings and detailed description. It is intended that all such additional objects, features, and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating principles of the present invention. In the drawings, like reference numerals designate corresponding parts throughout the several views.

DETAILED DESCRIPTION OF THE PREFERRED EMBODIMENTS

Figure 1:
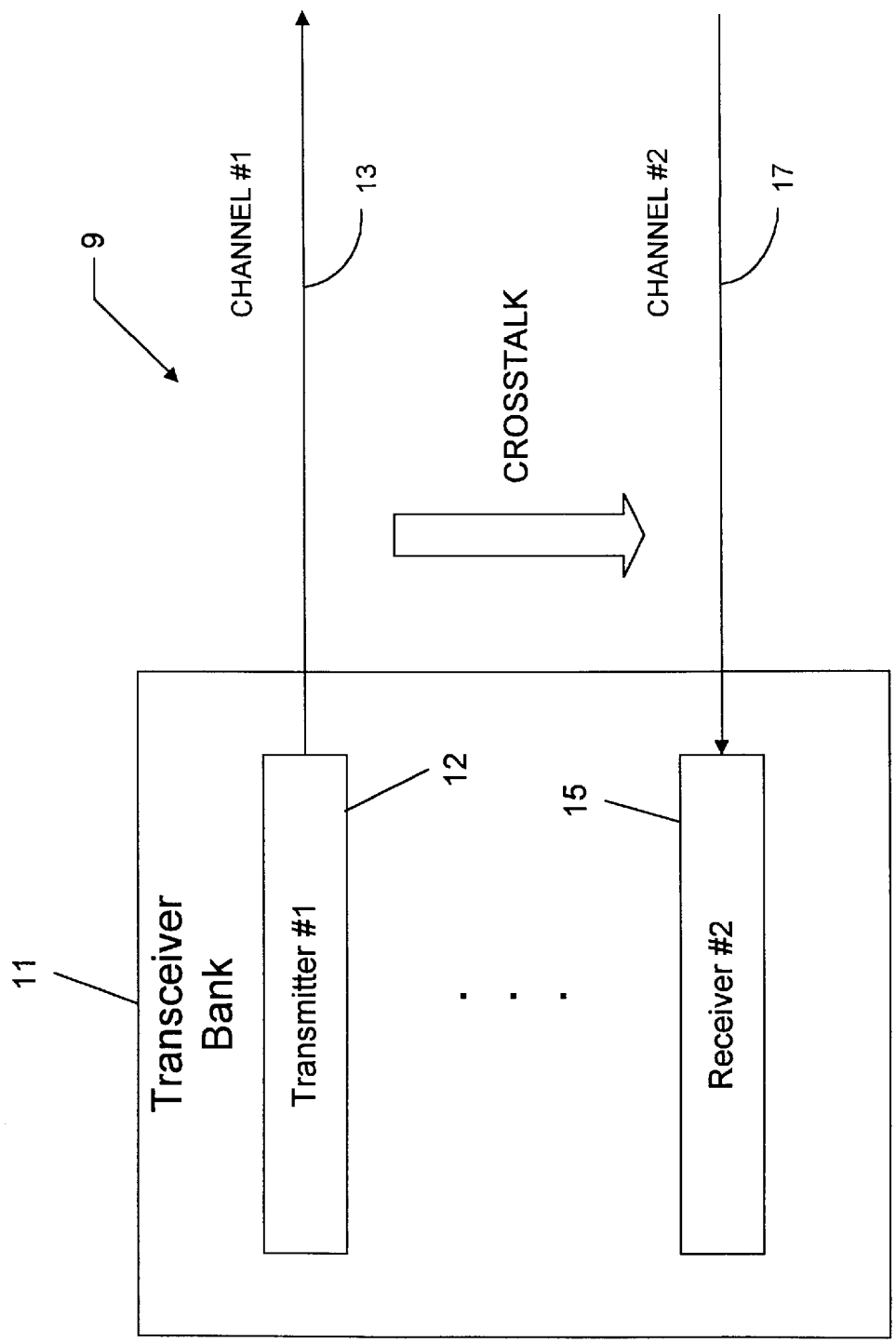
FIG. 1 is an electronic block diagram showing a transceiver bank having crosstalk from a transmission connection to a reception connection that inhibits performance of a receiver within the transceiver bank.
Figure 2:
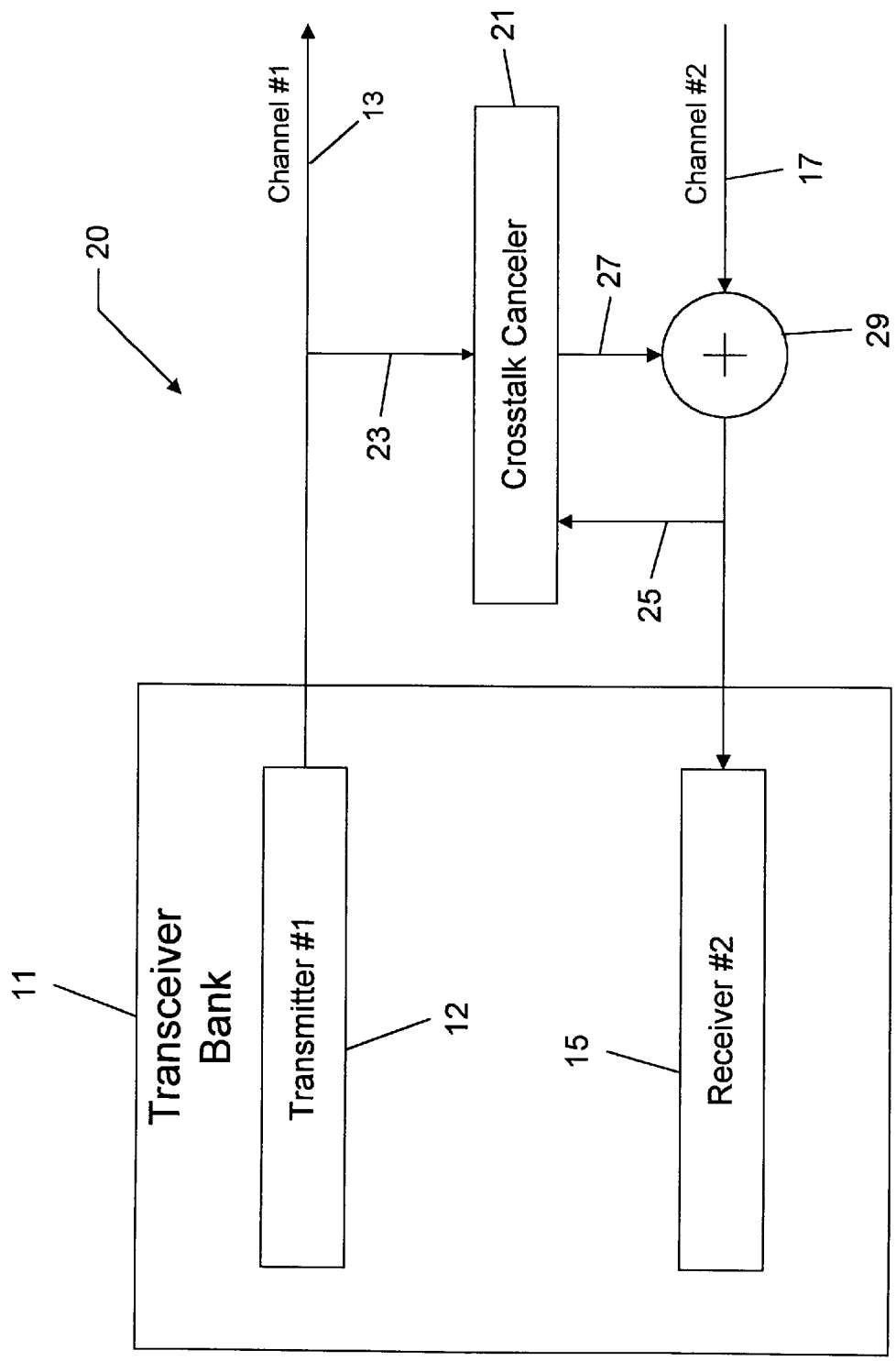
FIG. 2 is an electronic block diagram showing a first embodiment of the invention wherein a crosstalk canceller (CC) is utilized to cancel crosstalk from a transmission connection to a reception connection in the transceiver bank of FIG. 1.

As shown in FIG. 2, a crosstalk canceller (CC) system 20 in accordance with a first embodiment of the invention includes a transceiver bank 11 having at least one transmitter 12 (e.g., transmitter #1) and at least one receiver 15 (e.g., channel #2). The transmitter 12 transmits a transmit signal (TX) over a first communications channel (e.g., channel #1) on a connection 13, and the receiver 15 receives a receive signal (RX) over a second communications channel (e.g., channel #2) on a connection 17. Each of the first and second communications channels can be one directional or two directional, half duplex or full duplex, as well as one-wire or a plurality of wires. Moreover, these channels have overlapping operational frequency ranges, making the possibility of crosstalk filtering an unavailable option. As a mere example, the connections 13, 17 may be telephonic connections to the public switched telephone network (PSTN).

In accordance with the present invention, a CC 21, which is implemented in software, hardware, or a combination thereof, is configured to receive the transmit signal on connection 23 from the transmission connection 13, to receive the enhanced receive signal on connection 25 from the reception connection 17, and to generate a cancellation signal 27. The cancellation signal 27 is combined with the receive signal on connection 17 via a signal adder 29 to produce an enhanced receive signal for the receiver 15. The signal adder 29 can be any suitable device for mathematically combining the signals, a number of which are well known in the art.

The cancellation signal 27 is generated in the form of the converse of the crosstalk corruption imposed by the transmit signal on connection 13 so that the crosstalk corruption is eliminated from the receive signal on the connection 17. In order to generate the cancellation signal 27, the CC 21 is configured to modify the transmit signal from connections 13, 23. Within the CC 21, the transmit signal is modified with regard to phase versus frequency and amplitude versus frequency in order to produce the cancellation signal 27. The architecture and functionality of the CC 21 can, in general, be nearly identical to that of an echo cancellation system, many of which are well known in the art. For example, the architecture of the echo canceller as described in either U.S. Pat. No. 4,464,545 to Werner or U.S. Pat. No. 4,087,654 to Mueller could be utilized to implement the CC 21 of the present invention.

Figure 3A:
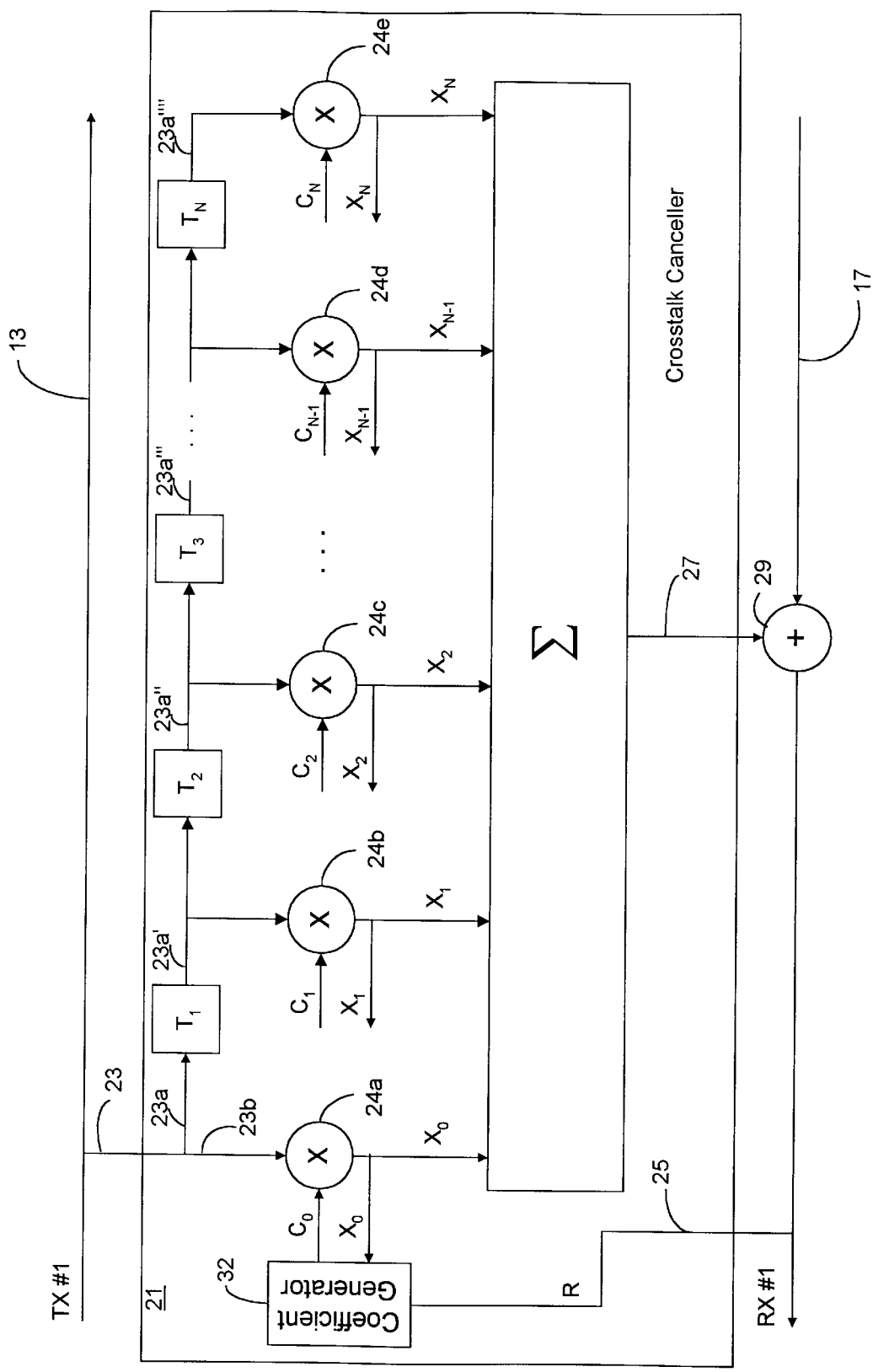
FIGS. 3A and 3B show an electronic block diagram of a possible implementation of the CC of FIG. 2.

As another more general example, a possible implementation of the CC 21 is shown in FIG. 3A This implementation is well known in the art of echo cancellation, but is applied herein with respect to crosstalk cancellation. The CC 21 generally comprises a series of successive filtering stages for receiving and processing the transmit signal (could be a receive signal in other implementations), each stage having a phase shift mechanism (T) for modifying the phase and a multiplier (X) for attenuating the amplitude. Referring to FIG. 3A, the CC 21 includes a plurality (N+1 in number) of multipliers configured to combine coefficients $C_0$–$C_N$ with respective inputs $23b$, $23a'$, $23a''$, $23a'''$, $23a''''$ in order to produce respective outputs $X_0$–$X_N$. The inputs $23a'$, $23a''$, $23a'''$, $23a''''$ are produced by imposing respective successive incremental delays T upon the transmit signal 23. The delay T is less than or equal to $1/f_s$, where $f_s$ is the Nyquist frequency. The coefficients $C_0$–$C_N$ are generated by a coefficient generator 32, a possible implementation of which is shown in further detail in FIG. 3B, based upon a correlation of the enhanced receive signal R and $X_0$–$X_N$, respectively.

Figure 3B:
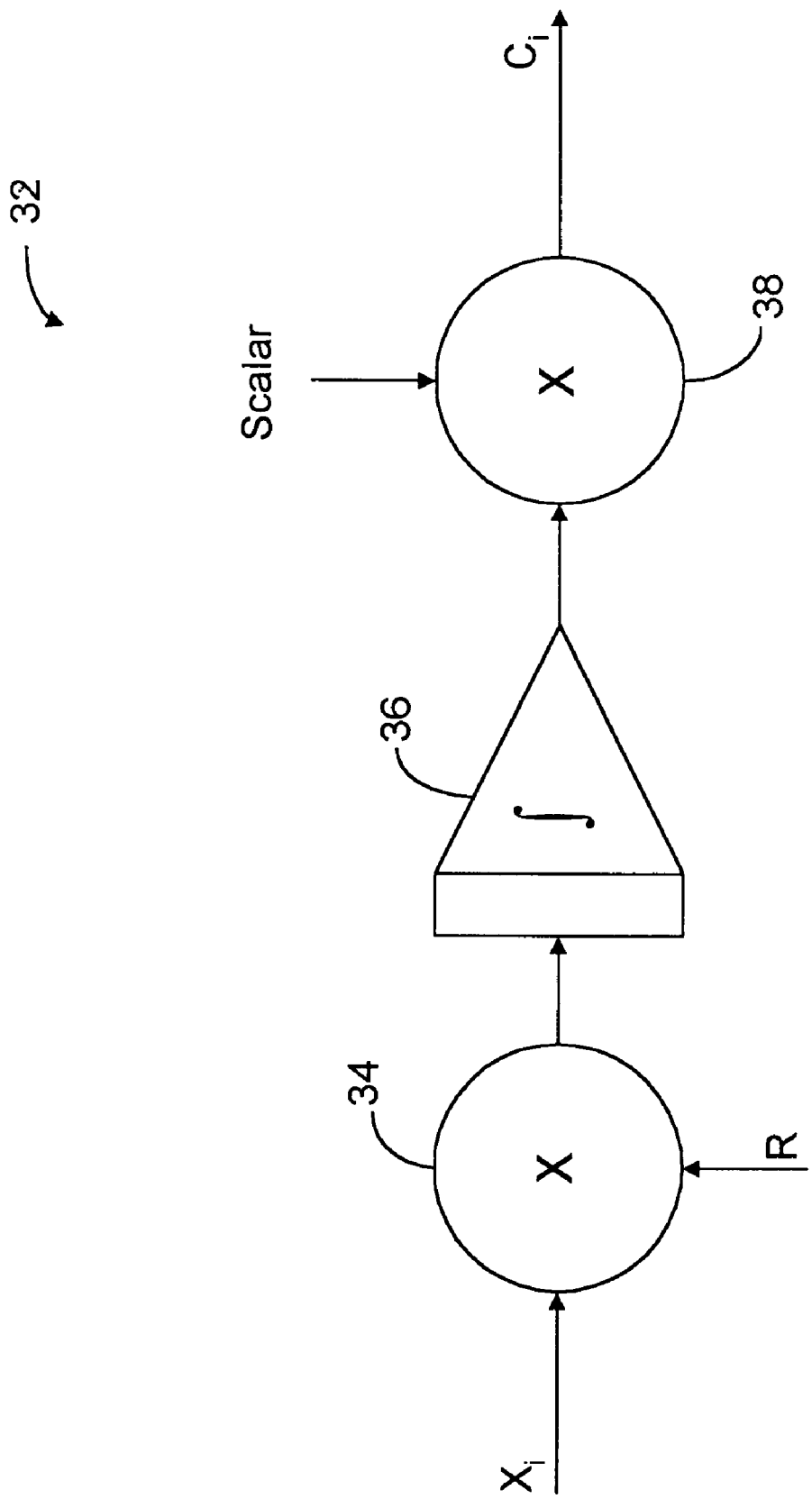

The coefficient generator 32 is essentially configured to perform a correlation function upon each $X_0$–$X_N$, based upon R, in order to produce a respective coefficient $C_0$–$C_N$ for a respective multiplier $24a$–$24e$. With reference to FIG. 3B, the coefficient generator 32 includes logic (one or more mechanisms) for generating each coefficient $C_i$, as follows: a multiplier 34 for receiving and combining R with each $X_i$ (where I=1, . . . , N), an integrator 36 for integrating the output of the multiplier 34, and a multiplier 38 for combining the output from the integrator 36 with a scalar to produce a coefficient $C_i$ (where I=1, . . . , N).

Referring back to FIG. 3A, the outputs $X_0$–$X_N$ from corresponding multipliers $24a$–$24e$ are mathematically combined, for example, summed, via summation mechanism 26 in order to produce the cancellation signal 27 that is the converse of the crosstalk corruption associated with the receive signal on connection 17. The cancellation signal 27 is combined with the receive signal on connection 17 via the summer 29 in order to generate the enhanced receive signal.

Figure 4:
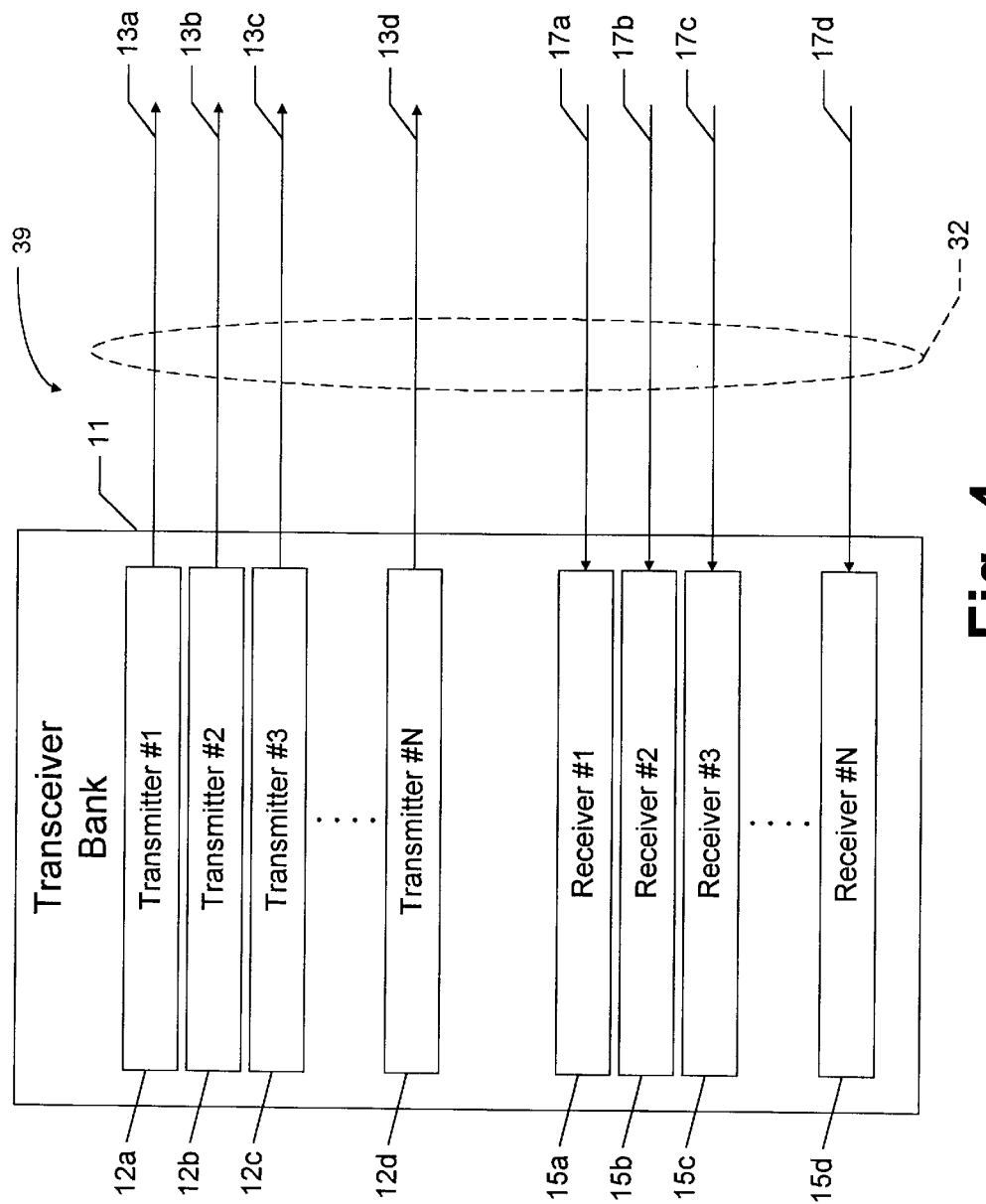
FIG. 4 is an electronic block diagram showing a transceiver bank with a plurality of transmitters and receivers with corresponding connections that may be bundled.

In systems that comprise a plurality of transmitters and/or receivers, crosstalk appearing on a connection to/from a particular communications device may be due to more than one other communications device. As an example, FIG. 4 shows a system 39 with a transceiver bank 11 having N transmitters $12a$–$12d$ and N receivers $15a$–$15d$. Typically, the transmission connections $13a$–$13d$ and the reception connections $17a$–$17d$ are bundled, bound, and/or adhered together, as indicated by reference ellipse 32. Thus, because the transmission connections $13a$–$13d$ and the reception connection $17a$–$17d$ are not substantially isolated from each other, crosstalk is inevitable from the transmission connections $13a$–$13d$ to the reception connections $17a$–$17d$ (and perhaps among the reception connections $17a$–$17d$ themselves).

Figure 5:
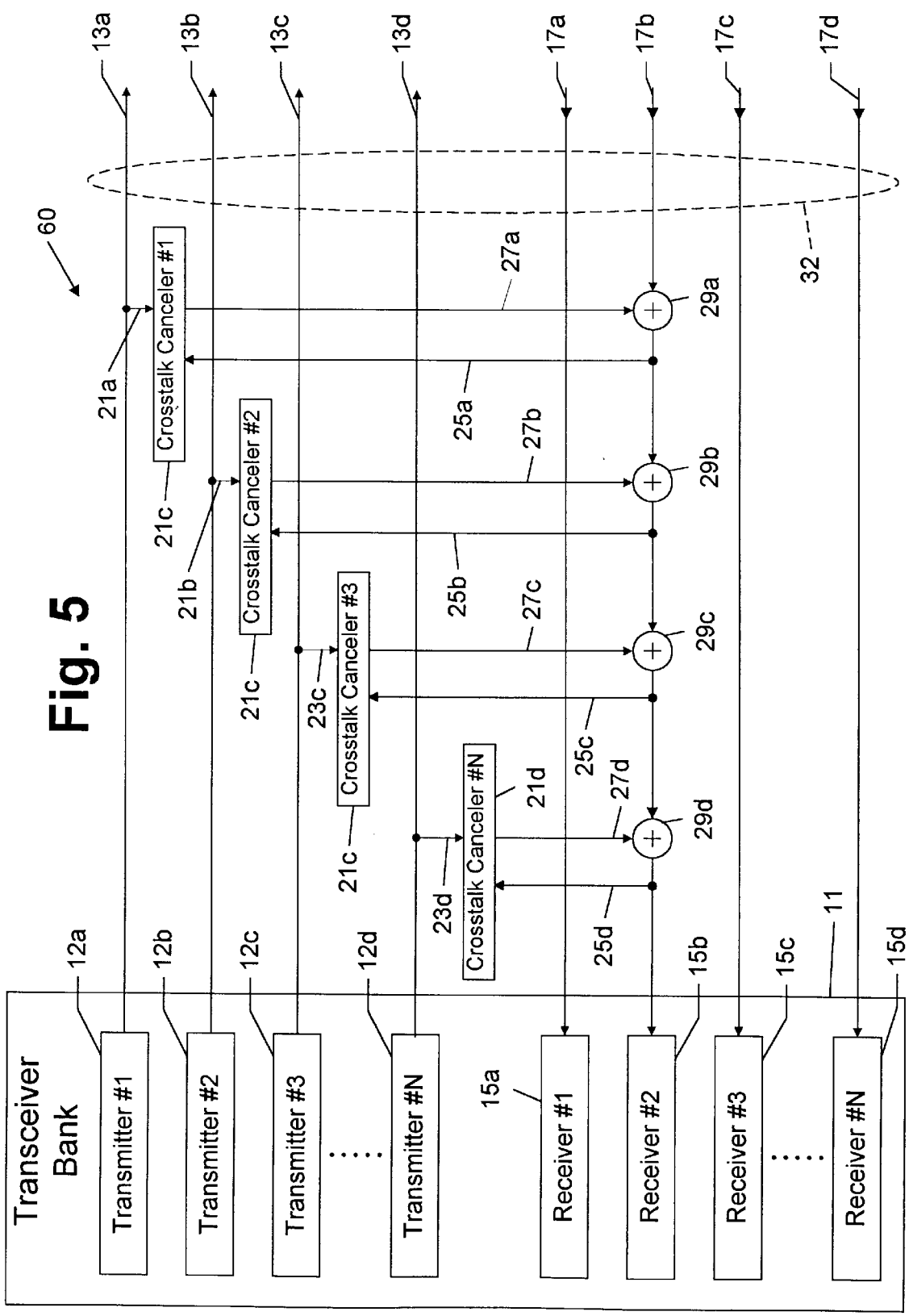
FIG. 5 is an electronic block diagram showing a second embodiment of the invention wherein a plurality of CC are utilized to cancel crosstalk from multiple sources in the transceiver bank of FIG. 4.

In order to cancel crosstalk in a specific receive signal given a plurality of transmit signals, a second embodiment of the invention, which is illustrated in FIG. 5 and generally denoted by reference numeral 60, employs CCs $21a$–$21d$ in connection with each of the N transmitters $12a$–$12d$ in order to cancel the contribution of crosstalk contributed by each.

More specifically, in regard to the transmission crosstalk from connection $13a$, a CC $21a$ is configured to receive the transmit signal on transmission connection $13a$, to receive the enhanced receive signal from connection $17b$, $25a$, and to generate a cancellation signal $27a$. A signal adder $29a$ combines the cancellation signal $27a$ with the receive signal on connection $17b$ in order to produce an enhanced receive signal $25a$, free of the crosstalk contributed by the transmit signal from transmitter $12a$. Similarly, CCs $21b$–$21d$ and their corresponding signal adders $29b$–$29d$ are disposed as shown in FIG. 5 in order to eliminate the crosstalk contribution from each of the transmission connections $13b$–$13d$ to the reception connection $17b$.

It is worth mentioning that in addition to employing a CC 21 between each transmission connection $13a$–$13d$ and each reception connection $17a$–$17d$, it may be desirable to employ a CC 21 between each reception connection $17a$–$17d$, especially when the reception connections $17a$–$17d$ are bundled, as indicated by reference ellipse 32. This configuration would minimize receive signal to receive signal crosstalk.

To ensure adequate crosstalk cancellation by the CCs $23a$–$23d$, the transmit signals on corresponding connections $13a$–$13d$ should be suitably uncorrelated so that they appear as nearly unpredictable noise to each other. This is necessary to insure that the crosstalk due to a given transmitter can be differentiated from potential crosstalk from another transmitter. This predicament may occur without employing a special mechanism, especially if each transmitter 12a–12d utilizes a data scrambler. In order to ensure uncorrelated transmit signals without the need for a data scrambler, a third embodiment of the invention is provided herein and illustrated in FIG. 6 and generally denoted by reference numeral 80.

Figure 6:
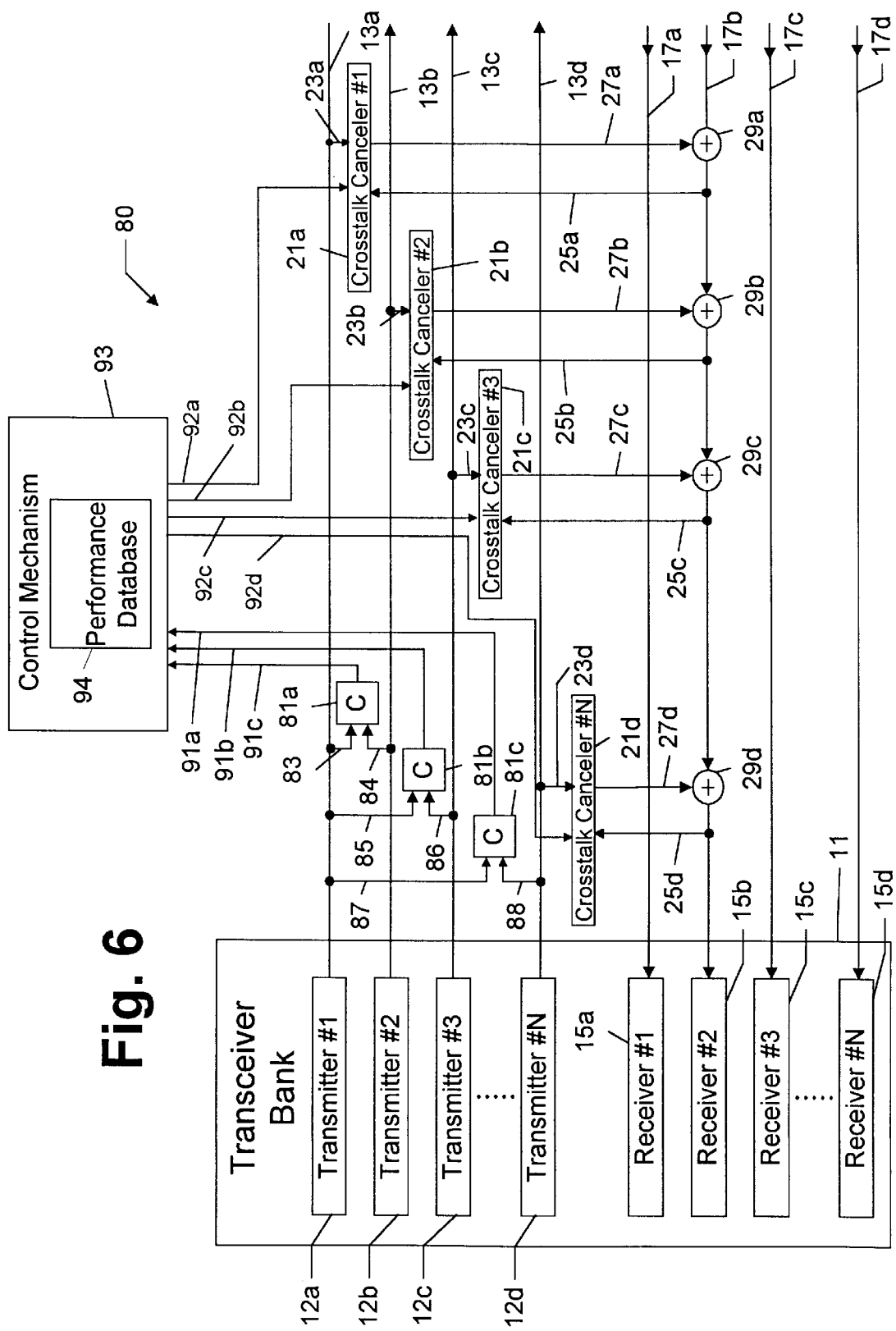
FIG. 6 is an electronic block diagram showing a third embodiment of the invention wherein correlators (C) are used in connection with a plurality of CCs to more intelligently cancel crosstalk from multiple sources in the transceiver bank of FIG. 4.

The CC system 80 of FIG. 6 includes a transceiver bank 11 having a plurality of CCs 23a–23d, a plurality of adders 29a–29d, a plurality of correlators 81a–81c, and a control mechanism 93. The foregoing elements can be implemented as hardware, software, or a combination thereof. In the preferred embodiment, the CCs 23a–23d, the adders 29a–29d, the correlators 81a–81c, and the control mechanism 93 are all implemented in software, which is stored in memory and executed by a suitable processor, such as a digital signal processor (DSP), which receives the appropriate inputs from the hardware connections.

Referring to FIG. 6, in the CC system 80, a correlator 81 is disposed between each of the transmission connections 13a–13d, for a total of (N−1) correlators 81a–81c, in order to determine when the transmit signals are insufficiently uncorrelated. For purposes of simplicity, only the correlator 81a corresponding to the transmitter 12a and transmission connection 13a are described hereafter. However, it should be emphasized that this described system is duplicated for each of the other combinations of transmitters and transmission connections, as are shown in FIG. 6.

The correlator 81a is configured to receive the transmit signal on connection 13a via a connection 83 and the transmit signal on connection 13b via a connection 84. The correlator 81a is configured to integrate the respective transmit signals over time and make a determination as to whether there is a match between the transmit signals. The correlator 81a produces an output 91a indicative of whether or not the transmit signals on connections 13a, 13b match. Correlators are well known in the art, and the foregoing functionality can be implemented using any suitable architecture. As an example, one embodiment of a correlator includes integrators for integrating the respective signals over time, and then the integrator outputs are compared at some point in order to determine if there is a correlation, or match.

A control mechanism 93 receives the correlation signals 91a–91c (N−1 in number) from the respective correlators 81a–81c N−1 in number), indicative of whether or not any of the transmit signals correspond with each other. The control mechanism 93 can control operation of the CCs 23a–23d, as indicated by reference arrows 92a–92d, respectively. The control mechanism 93 is configured to deactivate one or more of the CCs 23a–23d when a match occurs among transmit signals so that, at most, one CC 23 is operational in a set of CCs having correlated transmit signals. More specifically, consider the case when the transmit signals on connections 13a, 13b do in fact match. In this case, the CC 23a and/or CC 23b are deactivated by the control mechanism 93 so that the receive signal on connection 17b is not adversely affected.

As is apparent from FIGS. 5 and 6, a large number of CCs 23 may be necessary. In a system that cancels transmit signal crosstalk for all receivers, $N^2$ CCs 23 would be needed. Thus, it may be desirable to implement CCs 23 sparingly or only where needed.

The control mechanism 93 is designed to measure the crosstalk imposed by each transmitter 12 and associated connection 13 to a given receiver 15 and associated connection 17 in order to establish a performance database 94 showing the crosstalk contribution of each transmitter 12 and connection 13. The performance database 94 can be utilized by the control mechanism 93 to determine whether and where to implement the CCs 23.

The measurement for a given transmitter 12 under test is preferably made with that transmitter 12 connected to its connection in the manner in which the transmitter 12 will be connected during normal operation. Since crosstalk is mostly due to local wiring and interfaces, the connection status of the remote receiver 15 likely has a minor effect. Moreover, the local receiver 15 under test should be properly connected.

The measurement can be made during initialization of the transceiver bank 11 or unobtrusively during operation. During normal receiver operation, the crosstalk correlation of each transmitter 12 may be made without affecting the receive signal, and each transmitter 12 can either continue user data transmission or be configured to transmit a suitable data pattern. In the latter case, the transmit level can be lowered to reduce receiver crosstalk at the cost of a longer test correlation.

Measurements can be made by a CC 23 that is placed on the receiver 15 under test with input moved to each transmitter 12 under test. Such measurement can alternatively be made obtrusively with a shorter test by halting user data sessions and undergoing a special test session where, for example, each transmitter 12 is turned on momentarily for testing. Here, correlation of transmit signals is likely unnecessary since crosstalk is only possible from one source, i.e., the enabled transmitter 12.

The results of the testing can be placed into a static performance table having, for example, the information set forth in table A hereafter. Table A represents the crosstalk from each transmitter 12 to each receiver 15 when the transmitter 12 is turned on and transmitting at a specified level. For purposes of discussion, it is assumed that there are four transmitters 12a–12d and four receivers 15a–15d with associated circuitry.

TABLE A

STATIC PERFORMANCE TABLE

|  | Transmitter #1 | Transmitter #2 | Transmitter #3 | Transmitter #4 |
|---|---|---|---|---|
| Receiver #1 | −26 dB | −43 dB | −32 dB | −68 dB |
| Receiver #2 | −48 dB | −29 dB | −56 dB | −29 dB |
| Receiver #3 | −32 dB | −32 dB | −29 dB | −68 dB |
| Receiver #4 | −26 dB | −29 dB | −32 dB | −26 dB |

Note that the crosstalk values in Table A (as well as Table C) are expressed in decibels (dB). These values can be determined by measuring the receive signal of the corresponding receiver 15 with a voltage meter and then computing the table value as follows: table value=20log V, where V is the voltage of the receive signal. The table value can also be determined by measuring the power of the receive signal, in which case the table value is computed as follows: table value=20log P, where P is the power level. Finally, it should be emphasized that other parameters could be utilized to express the magnitude of the crosstalk.

The static performance table is preferably retained in the performance database 94, even if a transmitter 12 or a receiver 15 is turned off or not used. It should be updated when either a transmitter 12 or a receiver 15 is physically added or eliminated from the transceiver bank 11.

Assume, for example, that at least −30 dB net cross correlation is necessary for minimum receiver performance and that each CC 23 performs perfectly. As indicated in Table B below, seven CCs 23 are needed to permit all receivers 15 to perform (that is, to reduce net crosstalk below −30 dB).

TABLE B

|  | Transmitter #1 | Transmitter #2 | Transmitter #3 | Transmitter #4 |
|---|---|---|---|---|
| Receiver #1 | CC |  |  |  |
| Receiver #2 |  | CC |  | CC |
| Receiver #3 |  |  | CC |  |
| Receiver #4 | CC | CC |  | CC |

In many cases, not all transmitters 12 will be utilized, so it is useful to include the operational status for each transmitter 12. Similarly, not all receivers 15 will be utilized at all times so it is useful to include the operational status for each receiver 15. Accordingly, a dynamic performance table may be generated by the control mechanism 93 and stored in the performance database 94. An example of information that may be included in the dynamic performance table is illustrated hereafter in Table C. Again, for purposes of discussion, it is assumed that there are four transmitters 12a–12d and four receivers 15a–15d with associated circuitry.

TABLE C

DYNAMIC PERFORMANCE TABLE

|  | Transmitter #1-on | Transmitter #2-off | Transmitter #3-on | Transmitter #4-off |
|---|---|---|---|---|
| Receiver #1-on | −26 dB | −43 dB | −32 dB | −68 dB |
| Receiver #2-off | −48 dB | −29 dB | −56 dB | −29 dB |
| Receiver #3-on | −32 dB | −32 dB | −29 dB | −68 dB |
| Receiver #4-on | −26 dB | −29 dB | −32 dB | −26 dB |

In the example set forth in Table C, transmitters 12a, 12c (transmitter #1 and transmitter #3) and receivers 15a, 15c, 15d (receivers #1, #3, #4) are shown as turned on, or activated, whereas transmitters 12b, 12d (transmitter #2 and transmitter #N) and receiver 15b (receivers #2) are shown as turned off, or deactivated.

The dynamic performance table provides several opportunities to utilize fewer CCs 21. Because transmitter 12b, is not turned on, all four CCs 21 associated with it need not be operational. Furthermore, because receiver #2, denoted by reference numeral 15b (FIG. 5), is not turned on, the four CCs 21 associated with it need not be operational. Use of only the operational status alone has potential for significant reduction in net CC complexity. However, in the desirable situation where all transmitters 12 and all receivers 15 are in use, knowledge of the operational status by itself provides no advantage.

As described above in relation to Table C, seven CCs 23 are needed to permit all receivers 15 to perform (that is, reduce net crosstalk below −30 dB). However, if operational status is taken into account along with the performance data, then three of the CCs 23 can be eliminated, as shown in Table D hereafter.

TABLE D

|  | Transmitter #1-on | Transmitter #2-off | Transmitter #3-on | Transmitter #4-off |
|---|---|---|---|---|
| Receiver #1-on | CC |  |  |  |
| Receiver #2-off |  |  |  |  |
| Receiver #3-on |  |  | CC |  |
| Receiver #4-off | CC |  |  | CC |

In the general case where transmitters 12 and receivers 15 are turned on or off by user requirements or where data rate priorities are changed, it is possible for the control mechanism 93 to reallocate CCs 21 to where they are needed. Data rate changes can be managed with remote devices using various conventional mechanisms. In the aforementioned example, minimum receiver performance can be achieved at a net crosstalk level of −30 dB. Furthermore, the transmission data rates along connections 13, 17 may be, for example, one-bit-per-symbol at a symbol rate of 384,000 samples per second (sps). It is generally known in the art that each additional bit per symbol can be achieved for approximately each 3 dB reduction in net crosstalk. Thus, if the dynamic performance table of Table C was maintained and the CCs 21 of Table D were implemented, then the data rates of receivers 15 can be significantly increased.

It should be further noted that all transmitters 12 may be synchronized to a common clock without performance detriment. Such synchronization of transmit symbols permits simplification of the design of the plurality of CCs 21. Synchronization allows a single DSP or other suitable device(s) to cancel all crosstalk, while operating at a single processing rate. Information transfers between CCs 21 also occurs at a common rate. Calculations in the CCs 21 would occur at a common rate, thereby permitting many options for simple implementations.

Many variations and modifications may be made to the preferred embodiment of the invention as described previously. For example, the clamping system could be implemented in software, as opposed to the herein described hardware implementation. All such modifications and variations are intended to be included herein within the scope of the present invention, as is defined by the following claims.

Finally, in the claims hereafter, the structures, materials, acts, and equivalents of all "means" elements, "logic" elements, and steps are intended to include any structures, materials, or acts for performing the functions specified in connection with the elements.

Now, therefore, the following is claimed:

1. An improvement for a transceiver bank, the improvement comprising a crosstalk canceller configured to reduce crosstalk imposed by a first signal upon a second signal that is associated with a different communications channel on a different physical connection, the crosstalk canceller configured to receive the first signal from a first connection and the second signal from a second connection, configured to combine a cancellation signal with the second signal to generate an enhanced second signal, and configured to produce the cancellation signal based upon the enhanced second signal and the first signal, wherein application of said cancellation signal by said crosstalk canceller acts to reduce said crosstalk imposed upon said second signal by said first signal.

2. The improvement of claim 1, wherein the first and second signals have overlapping frequency bandwidths.

3. The improvement of claim 1, wherein the transceiver bank includes a transmitter, a receiver, and transmit and receive connections connected to the transmitter and the receiver, respectively, and corresponding with the first and second connections, respectively.

4. The improvement of claim 1, wherein the transceiver bank includes a plurality of receivers and wherein the first and second connections correspond to respective receive connections that are connected to respective receivers.

5. The improvement of claim 1, wherein the transceiver bank includes a plurality of transmitters and wherein the first and second connections correspond to respective transmit connections that are connected to respective transmitters.

6. The improvement of claim 1, wherein the first and second connections are telephonic connections.

7. The improvement of claim 1, wherein the first and second connections are each a one-wire connection.

8. The improvement of claim 1, wherein the first and second connections are each a wire-pair connection.

9. A system for improving performance in a transceiver bank by cancelling crosstalk between signals associated with different communications channels on separate physical connections, the system comprising:
   a transmitter configured to transmit a transmit signal on a transmit connection;
   a receiver configured to receive a receive signal on a receive connection, the transmit signal and the receive signal being associated with different communications channels; and
   a crosstalk canceller having:
      first means for receiving a transmit signal from the transmitter;
      second means for receiving the receive signal from the receive connection;
      third means for combining a cancellation signal with the receive signal to generate an enhanced receive signal;
      fourth means for communicating the enhanced receive signal to the receiver; and
      fifth means for producing the cancellation signal based upon the enhanced receive signal and the transmit signal.

10. A system for improving performance in a transceiver bank by cancelling crosstalk between signals associated with different communications channels on separate physical connections, the system comprising:
   a plurality of communications devices having respective communications connections for carrying respective communications signals; and
   a plurality of crosstalk canceller mechanisms, each of the crosstalk canceller mechanisms configured to produce and combine a cancellation signal with a single receive signal associated with one of the communications devices in order to reduce crosstalk imposed upon the receive signal by another communications device associated respectively with the corresponding crosstalk canceller mechanism.

11. The system of claim 10, wherein the crosstalk includes interference produced by a transmit signal.

12. The system of claim 11, wherein each of the crosstalk canceller mechanisms comprises:
   first means for receiving a first signal from a communications connection of a first communications device;
   second means for receiving the receive signal from a receive connection;
   third means for combining the cancellation signal with the receive signal to generate an enhanced receive signal; and
   fourth means for producing the cancellation signal based upon the enhanced receive signal and the first signal.

13. The system of claim 11, wherein the crosstalk includes interference produced by a receive signal.

14. A system for improving performance in a transceiver bank by cancelling crosstalk between different communications channels having separate connections, the system comprising:
   a plurality of transmitters configured to transmit respective transmit signals on corresponding transmit connections;
   a plurality of receivers configured to receive respective receive signals on corresponding receive connections; and
   a plurality of crosstalk cancellers configured to receive a transmit signal from one of the transmitters and a corresponding enhanced receive signal that is communicated to a corresponding receiver and to produce a cancellation signal;
   a plurality of adders configured to combine a corresponding receive signal and a corresponding cancellation signal from a corresponding crosstalk canceller to produce a corresponding enhanced receive signal and configured to communicate the enhanced receive signal to a corresponding receiver and the corresponding crosstalk canceller.

15. The system of claim 14, further comprising:
   a correlator configured to receive separate transmit signals, to correlate the signals, and to generate a correlation signal indicative of whether the signals correspond; and
   a control mechanism configured to receive the correlation signal and to deactivate at least one of the crosstalk cancellers when the signals correspond.

16. The system of claim 14, further comprising:
   a performance table configured to store crosstalk contribution values, each of the values corresponding with an amount of crosstalk attributable from a particular transmitter and corresponding transmit connection to a particular receive connection;
   a control mechanism configured to determine and store the values in the table, configured to implement the crosstalk cancellers relative to each transmitter and corresponding transmit connection that has a value below a threshold, and configured to refrain from implementing the crosstalk cancellers relative to each transmitter and corresponding transmit connection that has a value of at least the threshold.

17. The system of claim 14, wherein the performance table stores an indication as to whether each transmitter and each receiver is activated and wherein the control mechanism is configured to refrain from implementing the crosstalk cancellers that are to receive transmit signals from deactivated transmitters and that are to communicate cancellation signals to deactivated receivers.

18. A method for improving performance in a transceiver bank having separate first and second connections that carry respective first and second signals associated with different communications channels on different physical connections, the method for canceling crosstalk between the first and second connections, comprising the steps of:
   receiving the first signal from the first connection;
   receiving the second signal from the second connection;
   combining a cancellation signal with the second signal to generate an enhanced second signal; and
   producing the cancellation signal based upon the enhanced second signal and the first signal, for reducing said crosstalk.

19. The method of claim 18, further comprising the step of transmitting and receiving the first and second signals, respectively, from a transmitter and receiver, respectively.

20. The method of claim 18, further comprising the step of communicating the first and second signals on the first and second connections, respectively, with overlapping frequency bandwidths.

21. The method of claim 18, further comprising the step of receiving both the first and second signals on the first and second connections respectively.

22. The method of claim 18, further comprising the step of transmitting both the first and second signals on the first and second connections respectively.

23. The method of claim 18, further comprising the step of interfacing the first and second connections with respective telephone connections.

24. A method for a transceiver having transmitters configured to transmit respective transmit signals on corresponding transmit connections and receivers configured to receive respective receive signals on corresponding receive connections, the first and second signals corresponding with different communications channels, the method for improving performance by cancelling crosstalk between the transmit and receive connections, the method comprising the steps of:

determining crosstalk contribution values, each of the values corresponding with an amount of crosstalk attributable from a particular transmitter and corresponding transmit connection to a particular receive connection;

when the value pertaining to each transmitter, associated transmit connection, and receiver meets at least a threshold, then producing and combining a cancellation signal with the receive signal of the receiver to counteract crosstalk contributed by the transmitter;

when the value pertaining to each transmitter, associated transmit connection, and receiver is below the threshold, then refraining from producing and combining the cancellation signal with the receive signal of the receiver to counteract crosstalk contributed by the transmitter.

25. The method of claim 24, further comprising the steps of:

correlating transmit signals; and refraining from producing and combining the cancellation signal corresponding with at least one of the transmitters that is associated with one of the transmit signals when the transmit signals correspond.

26. The system of claim 24, further comprising the steps of:

determining whether each transmitter and each receiver is activated; and refraining from producing and combining the cancellation signals corresponding with deactivated transmitters and deactivated receivers.

27. A method for improving performance in a transceiver bank by cancelling crosstalk between signals associated with different communications channels on separate physical connections, the method comprising the steps of:

implementing a plurality of communications devices having respective communications connections for carrying respective communications signals;

implementing a plurality of crosstalk canceller mechanisms, each of the crosstalk canceller mechanisms being allocated to a respective communications device;

producing a cancellation signal with each of the crosstalk cancellers based upon a signal associated with the respective communications device: and combining the cancellation signals from each of the crosstalk cancellers with a single receive signal associated with one of the communications devices in order to reduce crosstalk imposed upon the receive signal by the other communications devices.

28. The method of claim 27, further comprising the step of producing at least one of the cancellation signals based upon a transmit signal.

29. The method of claim 27, further comprising the step of producing at least one of the cancellation signals based upon a receive signal.

30. An improvement for a transceiver bank, the improvement comprising a crosstalk canceller configured to reduce crosstalk imposed by a first signal upon a second signal that is associated with a different communications channel, wherein the first and second signals have overlapping frequency bandwidths, the crosstalk canceller configured to receive the first signal from a first connection and the second signal from a second connection, configured to combine a cancellation signal with the second signal to generate an enhanced second signal, and configured to produce the cancellation signal based upon the enhanced second signal and the first signal.

31. The improvement of claim 30, wherein the transceiver bank includes a transmitter, a receiver, and transmit and receive connections connected to the transmitter and the receiver, respectively, and corresponding with the first and second connections, respectively.

32. The improvement of claim 30, wherein the transceiver bank includes a plurality of receivers and wherein the first and second connections correspond to respective receive connections that are connected to respective receivers.

33. The improvement of claim 30, wherein the transceiver bank includes a plurality of transmitters and wherein the first and second connections correspond to respective transmit connections that are connected to respective transmitters.

34. The improvement of claim 30, wherein the first and second connections are telephonic connections.

35. The improvement of claim 30, wherein the first and second connections are each a one-wire connection.

36. The improvement of claim 30, wherein the first and second connections are each a wire-pair connection.

37. A method for improving performance in a transceiver bank having separate first and second connections that carry respective first and second signals associated with different communications channels, the method for canceling crosstalk between the first and second connections, comprising the steps of:

receiving the first signal from the first connection;

receiving the second signal from the second connection;

communicating the first and second signals on the first and second connections, respectively, with overlapping frequency bandwidths;

combining a cancellation signal with the second signal to generate an enhanced second signal; and producing the cancellation signal based upon the enhanced second signal and the first signal.

38. The method of claim 37, further comprising the step of transmitting and receiving the first and second signals, respectively, from a transmitter and receiver, respectively.

39. The method of claim 37, further comprising the step of receiving both the first and second signals on the first and second connections respectively.

40. The method of claim 37, further comprising the step of transmitting both the first and second signals on the first and second connections respectively.

41. The method of claim 37, further comprising the step of interfacing the first and second connections with respective telephone connections.

42. An improvement for a transceiver bank, the improvement comprising a crosstalk canceller configured to reduce crosstalk imposed by a first signal upon a second signal that is associated with a different communications channel, the crosstalk canceller configured to receive the first signal from a first telephonic connection and the second signal from a second telephonic connection, configured to combine a cancellation signal with the second signal to generate an enhanced second signal, and configured to produce the cancellation signal based upon the enhanced second signal and the first signal, wherein application of said cancellation signal by said crosstalk canceller acts to reduce said crosstalk imposed upon said second signal by said first signal.

43. The improvement of claim 42, wherein the transceiver bank includes a transmitter, a receiver, and transmit and receive connections connected to the transmitter and the receiver, respectively, and corresponding with the first and second connections, respectively.

44. The improvement of claim 42, wherein the transceiver bank includes a plurality of receivers and wherein the first and second connections correspond to respective receive connections that are connected to respective receivers.

45. The improvement of claim 42, wherein the transceiver bank includes a plurality of transmitters and wherein the first and second connections correspond to respective transmit connections that are connected to respective transmitters.

46. A method for improving performance in a transceiver bank having separate first and second connections that carry respective first and second signals associated with different communications channels, the method for canceling crosstalk between the first and second connections, comprising the steps of:

receiving the first signal from the first connection;

receiving the second signal from the second connection;

combining a cancellation signal with the second signal to generate an enhanced second signal; producing the cancellation signal based upon the enhanced second signal and the first signal, for reducing said crosstalk; and interfacing the first and second connections with respective telephone connections.

47. The method of claim 46, further comprising the step of transmitting and receiving the first and second signals, respectively, from a transmitter and receiver, respectively.

48. The method of claim 46, further comprising the step of receiving both the first and second signals on the first and second connections respectively.

49. The method of claim 46, further comprising the step of transmitting both the first and second signals on the first and second connections respectively.

50. A system, comprising:

a plurality of communications devices having respective physically separate communications connections for carrying respective communications signals; and at least one crosstalk canceller mechanism configured to produce and combine a cancellation signal with a single receive signal associated with one of the communications connections in order to reduce crosstalk imposed upon the receive signal by another communications connection associated respectively with the corresponding crosstalk canceller mechanism.

51. The system of claim 50, wherein the respective communication signals have overlapping frequency bandwidths.

52. The system of claim 50, wherein the crosstalk includes interference produced by a transmit signal.

53. The system of claim 50, wherein the crosstalk includes interference produced by a receive signal.

54. A system, comprising:

a plurality of physically separate communications lines; and at least one crosstalk canceller configured to reduce crosstalk imposed by a first signal upon a second signal that is associated with a different communications channel on a different physical connection, the crosstalk canceller configured to receive the first signal from a first connection and the second signal from a second connection, configured to combine a cancellation signal with the second signal to generate an enhanced second signal, and configured to produce the cancellation signal based upon the enhanced second signal and the first signal, wherein application of said cancellation signal by said crosstalk canceller acts to reduce said crosstalk imposed upon said second signal by said first signal.

55. The system of claim 54, wherein the first and second signals have overlapping frequency bandwidths.

56. The system of claim 54, wherein the crosstalk includes interference produced by a transmit signal.

57. The system of claim 54, wherein the crosstalk includes interference produced by a receive signal.

* * * * *

UNITED STATES PATENT AND TRADEMARK OFFICE
CERTIFICATE OF CORRECTION

PATENT NO. : 6,160,790
DATED : December 12, 2000
INVENTOR(S) : Bremer

It is certified that error appears in the above-identified patent and that said Letters Patent is hereby corrected as shown below:

Column 4, line 38, delete "dearly" and insert --clearly--.

Column 4, line 55, delete "CC" and insert --CCs--.

Column 5, line 8, delete "one directional" and insert --one-directional--.

Column 5, lines 8 and 9, delete "two directional" and insert --two-directional--.

Column 5, line 9, delete "one-wire" and insert --one wire--.

Column 7, line 45, before "N-1" insert --(--.

UNITED STATES PATENT AND TRADEMARK OFFICE
CERTIFICATE OF CORRECTION

PATENT NO. : 6,160,790
DATED : December 12, 2000
INVENTOR(S) : Bremer

It is certified that error appears in the above-identified patent and that said Letters Patent is hereby corrected as shown below:

Column 10, line 38, delete "clamping" and insert --crosstalk canceller--.

Column 12, line 12, delete "and".

Column 12, line 17, after "signal;" insert --and--.

Column 12, line 38, after "connection;" insert --and--.

Column 13, line 35, after "transmitter;" insert --and--.

Column 14, line 3, delete ":" and insert --;--.

Column 15, line 43, place the text beginning "producing" on a new line.

Signed and Sealed this

Twenty-ninth Day of May, 2001

Attest:

NICHOLAS P. GODICI

*Attesting Officer*  *Acting Director of the United States Patent and Trademark Office*